April 26, 1949.　　　　F. J. LUNDBURG　　　　2,468,090
LOCATION FINDER

Filed May 21, 1945　　　　　　　　　　　　　　2 Sheets-Sheet 1

INVENTOR.
FRANK J. LUNDBURG

BY

RP Morris
ATTORNEY

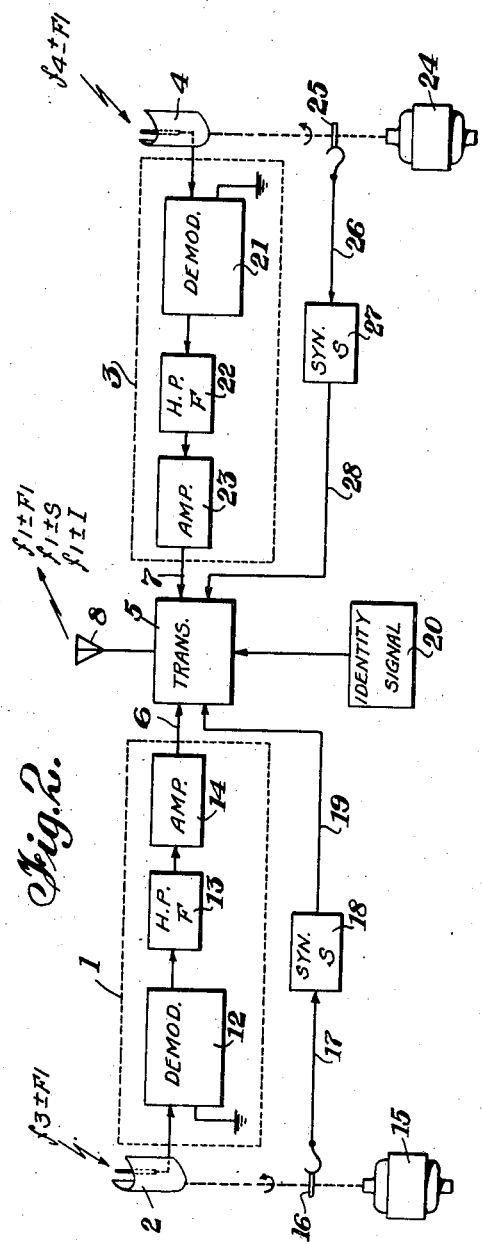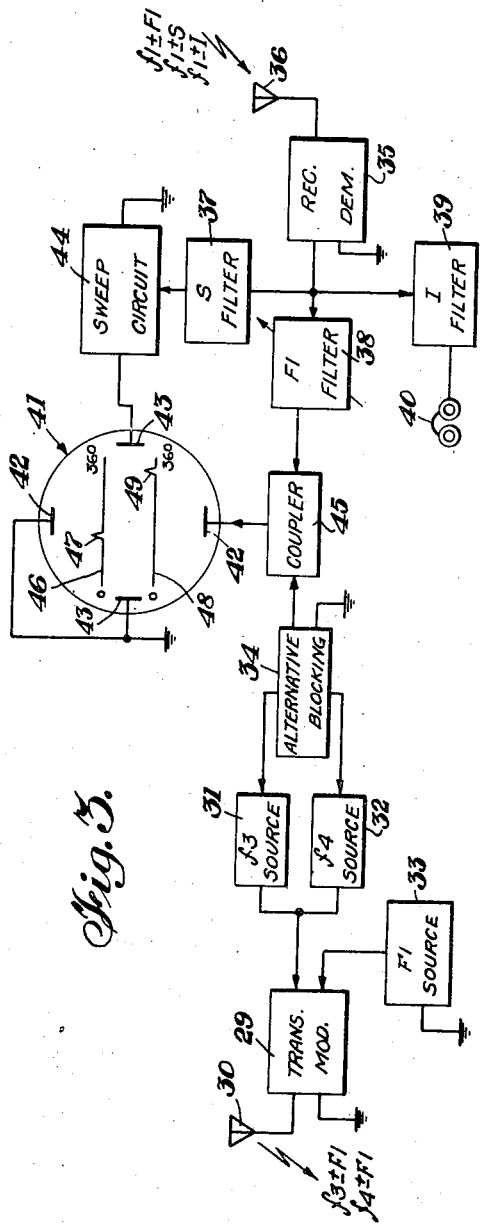

Patented Apr. 26, 1949

2,468,090

UNITED STATES PATENT OFFICE 2,468,090

LOCATION FINDER

Frank J. Lundburg, New York, N. Y., assignor to Federal Telephone and Radio Corporation, New York, N. Y., a corporation of Delaware Application May 21, 1945, Serial No. 594,865

18 Claims. (Cl. 343—112)

1

This invention relates to location finder systems and more particularly to radio location finder systems utilizing relatively fixed direction finding receiver arrangements.

It is well known that the location of mobile craft may be determined at a fixed point by means of direction finders spaced a predetermined distance apart. This system has been used for guiding airplanes but generally is not adapted to serve more than one plane at a time. According to this known type of system, an aircraft wishing to know its location would signal to the ground receivers. The ground receivers then would take bearings of the craft at the two spaced points to determine the location by triangulation. When this location was once determined, the information was transmitted by radio back to the craft.

According to my invention, the general principle of providing the direction finding apparatus on the ground for locating aircraft is utilized. However, the receiver equipment, in accordance with my system, is continuously scanned over a predetermined angle, preferably of 360°. Each craft is provided with means for transmitting signals characteristic of the identity of the craft. When a direction finding receiver is aligned with a craft, the special signal from that craft is received and detected. This detected signal is then caused to modulate another carrier which is radiated to the craft. Preferably this second carrier is radiated omnidirectionally and is modulated also with a synchronizing signal synchronized with the rotary position of the direction finder. These signals then received on the craft are separated and are used to operate a direction indicator which will give the direction line angle of the craft toward each receiver apparatus.

Thus, on the craft, is provided directly the information necessary for triangulation to locate the position of the craft relative to the ground station. Since each craft has a different identifying signal and has a circuit which will select this signal to the exclusion of the identifying signals of the other craft, a plurality of craft may be served simultaneously by the same locating equipment. Since there will generally be a number of such location finders across the country, each such location finder transmitter preferably also transmits an identifying signal to identify the particular station from which direction is being established.

It is an object of my invention to provide a location finding system which will provide for producing on a mobile unit indications of the position of the mobile unit with respect to a fixed directive receiver apparatus.

It is a further object of my invention to provide a radio location apparatus wherein a plurality of aircraft may receive indications of their locations with respect to a ground station provided with relatively fixed direction finding receivers and special signal transmitting apparatus.

It is a still further object of my invention to provide a receiver-transmitter system for transmitting location signals in response to received special signals from mobile units wherein two spaced directional receivers are provided to receive the special signal and transmitter means is provided to retransmit the special received signal together with synchronizing signals back to the craft.

It is a still further object of my invention to provide a location finding system for indicating on each of a plurality of aircraft the position of these aircraft with respect to the location finding stations wherein, by receipt of special signals from each of the aircraft, the location of the craft is determined on a relatively fixed ground station consisting of two directional receivers; and this information together with synchronizing signals of the direction finding receivers is retransmitted to the craft, and wherein on the craft is provided special apparatus responsive to these retransmitted signals for producing indications relevant to the location of the equipment of the mobile unit with respect to the fixed station.

A better understanding of my invention as well as further objects and features thereof will be had from the specific description of a particular embodiment thereof made with reference to the accompanying drawing, in which:

Fig. 2 is a block circuit diagram of the fixed installation of direction finders and transmitters for use in a system as illustrated in Fig. 1; and Fig. 3 is a block circuit diagram of the mobile unit equipment for use with the system shown in Fig. 1.

Figure 1:
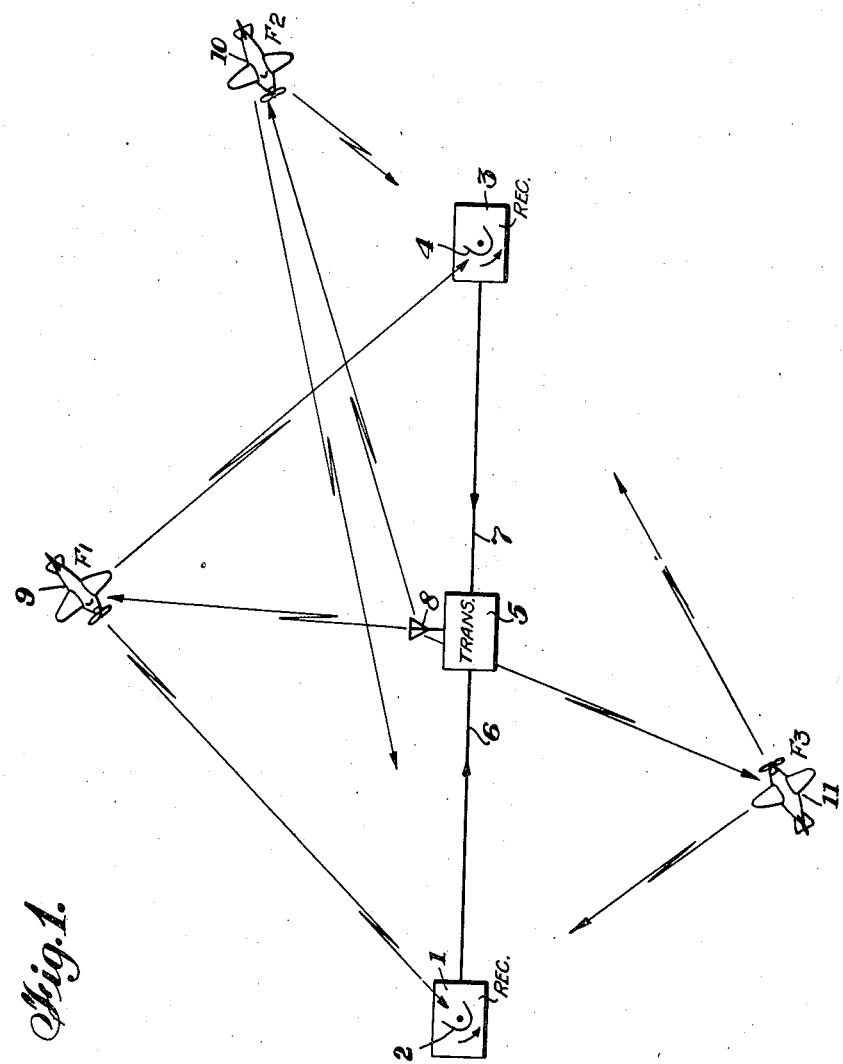
Fig. 1 is a diagrammatic plan view of a radio location finder system in accordance with my invention.

In Fig. 1 is illustrated a system comprising a fixed location finder including a receiver 1 having a rotatable directional antenna 2, a receiver 3 spaced from receiver 1 and having a rotatable directional antenna 4, a transmitter 5 coupled by lines 6 and 7 respectively, to receivers 1 and 3 so that the received signals may be applied to the transmitter, and an omnidirectional transmitting antenna 8 coupled to transmitter 5. Three aircraft 9, 10 and 11, each of which may be considered as a mobile unit for cooperative action with the relatively fixed location receivers, are shown in the field of the locating unit. Each of airplanes 9, 10 and 11 may transmit carrier frequencies $f3$ and $f4$ for reception at receivers 1 and 3 respectively. Each of the separate aircraft 9, 10 and 11 also must provide a modulating circuit for giving to the radiated energy a particular characteristic signal which may be different signal frequencies F1, F2 and F3 respectively. At receivers 1 and 3 the energy from the mobile unit is received when the respective antennas 2 and 4 are aligned with the craft. This received energy is demodulated and the demodulated signals are transmitted over the respective lines 6 and 7 to the transmitter 5. Transmitter 5 radiates preferably omnidirectionally, on a still different carrier frequency $f1$, and transmits the received characteristic signals, and simultaneously transmits a synchronizing signal indicating the relative rotary positions of antennas 2 and 4. These signals are received on the craft so that by cooperation of the synchronizing signals and the selection of a particular characteristic signal, the direction line from each craft to the two receivers may be determined and consequently by triangulation the location of the receiver with respect to the location finder system.

It will be clear that this type of system may serve simultaneously a plurality of craft in a given area. Each craft or other mobile unit must be provided with a different characteristic signal in order to avoid confusion and must be specifically selective of the particular frequency also in order to avoid confusion in the reception of signals. The number of craft which may be served by the system is limited by the number of assigned special signals and by the limits in the percentage modulation at transmitter 5, depending upon the number of craft simultaneously sending signals to the receiver.

In Fig. 2 is shown a typical direction finder position determining installation comprising receivers 1 and 3, the associated antennas 2 and 4 and the transmitter 5. The directive antenna 2 may be assumed, at present, to be aligned for reception of signals from unit 9 (Fig. 1) so that there is received by the antenna at this particular moment a carrier frequency $f3$ carrying signal frequency F1. This received energy is applied to demodulator 12 where the signal F1 is separated. It will be understood that other signals may likewise be received if other mobile units happen to be aligned with antenna 2. A high-pass filter 13 serves to pass these received signal frequencies on to amplifier 14. High-pass filter 13 is designed to remove the low frequency intermodulation components that might be present in the various detected signal frequencies such as F1, F2 and F3. These signals are then applied over line 6 to transmitter 5. A motor 15 serves continuously to rotate directive antenna 2 and simultaneously rotates a synchronizing disc 16 coupled over a line 17 to the synchronizing signal source 18 which produces synchronizing signal S. This signal S is applied over line 19 to transmitter 5 to also modulate the transmitted energy. In order to identify the transmitter, an identity signal generator 20 also serves to supply identity signal energy I to modulate the carrier frequency $f1$ of transmitter 5.

The other directional receiver 5 likewise has a rotatable antenna 4 and is provided with a demodulator 21 which serves to receive and demodulate signals of carrier frequency $f4 \pm$ side band frequency energies such as F1, F2 and F3. Assume for the purposes of illustration that the antenna 4 is now aligned for reception of energy from unit 9. The special signal F1 from the output of demodulator 21 is passed over a high-pass filter 22 of similar characteristics to high-pass filter 13 and an amplifier 23 to transmitter 5. A motor 24 serves continuously to rotate antenna 4 and a second synchronizing disc 25 which is coupled over a line 26 to a synchronizing signal generator 27 from which the synchronizing signal may be applied over line 28 to transmitter 5. Preferably, motors 15 and 24 are synchronized with one another and synchronizing signals from 18 and 27 are identical. Accordingly, in such a system, one of these synchronizing signals may be eliminated since either will serve properly to synchronizing the receiving indicator. However, if the direction finding antennas are rotated at different speeds then separate synchronizing signals must be provided and separate selection for these signals also provided at the receiver for producing the indications.

It will be clear in the system as described above that from antenna 8 is radiated carrier frequency $f1 \pm$ side band signal components of F1, S and I.

In Fig. 3 is illustrated the equipment which may be carried on a mobile unit such as 9 of Fig. 1. In this arrangement is provided a transmitter 29 having an omnidirectional antenna 30. Two carrier frequency sources 31 and 32 are provided for supplying carrier frequency energy at $f3$ and $f4$. A signal generator 33 is provided producing a signalling frequency at F1. In transmitter 29 the carrier frequency $f3$ or $f4$, whichever is at the moment applied, is modulated with the signal F1 so that from the antenna 30 is radiated $f3 \pm$ F1 or $f4 \pm$ F1. A blocking circuit 34 is provided alternately to block sources 31 and 32 so that the carrier frequency $f3$, $f4$ are alternately transmitted. This frequency of alternation is preferably at a rate relatively high with respect to the rotary speed of the direction finding antennas so that whenever any direction finding antenna is aligned with mobile unit, energy of the carrier frequency to which the direction finder is tuned will be received.

The radiated energy from antenna 8 (Fig. 2) is demodulated in the receiver demodulator 35 after reception by antenna 36. In the output of receiver demodulator 35 are provided filters 37, 38 and 39 serving to select synchronizing frequency S, unit characteristic frequency F1 and identity signal frequency I respectively. The identity signal may be applied to an indicating unit such as headphones 40 for example. As a location indicator, I have illustrated a cathode ray tube 41 having vertical deflecting plates 42 and horizontal deflecting plates 43. The selected synchronizing signal S is applied to a sweep circuit 44 to generate a sweep potential which is applied across plate 43 to sweep the beam of the indicating oscilloscope horizontally. The selected output signal F1 is applied over a coupler 45 to the vertical deflecting plates 42 to produce a vertical deflection of the beam.

At the same time the alternate blocking signal from blocker 34 is applied over coupler 45 to the vertical deflecting plates 42 to produce a lateral displacement of the sweep frequency beam in synchronism with the switching of the transmitter to sources 31 and 32. The upper indicating trace 46 may be considered as the trace produced during transmission of energy at some source 31. This trace is made synchronous with the rotation of the direction finding antenna so that the vertical deflection indicated by pulse 47 will correspond in angle to the angular relationship of directional antenna 2 with respect to the mobile unit. Sweep line 48 corresponds to the period when energy from source 32 is being transmitted and consequently corresponds to the angular position of antenna 4. The vertical deflection pulse 49 thus indicates the angular relationship of antenna 4 with respect to the mobile unit. It will therefore be clear that on the indicator 41 is provided an indication of both the directions toward the spaced direction finding receiver. Since the spacing of receivers 1 and 3 is known, the location of the unit with respect thereto may be readily determined by triangulation.

It will be clear that if manual operation is desired, alternate blocker 34 need not be used and the sources 31 and 32 may be manually switched into operation. Readings of the directions may be separately obtained on the single sweep of the oscilloscope indicator.

Furthermore, it should be understood that different types of antennas than those shown at 2 and 4 may be provided if desired. The selectivity of the received signal may be obtained by antennas having a sharp directive null if desired or by cross beamed type of direction finding antennas instead of the maximum lobe type illustrated.

It will likewise be clear that many different types of indicators may be provided at the mobile units other than that illustrated above. For example, separate rotating pointers may be provided synchronized separately by different distinctive synchronizing signals from 16 and 27, these rotating pointers being in the form of discs having slots. Lamps illuminated in response to the received unit signals may be provided behind these slots so that the selected received signals produce directly an intersection showing the relative location of the mobile unit. In such a system the two pointers should be spaced apart a distance proportional to the fixed spacing of receiver units 1 and 3.

It will be further apparent that many other modifications of the system will present themselves readily to those skilled in the art. Different types of signals such as pulses of different widths or of different shapes may be used instead of the different frequencies for the separate identifying signals, for example. It is to be understood that the specific illustrations given herein are made merely by way of example and are not to be considered as a limitation on my invention as set forth in the objects thereof and in the appended claims.

I claim:

1. A position indicating transmission system for transmitting position indicating signals in response to received characteristic signals from a source, comprising first and second spaced directional receivers for receiving said signals, means for angularly varying the directive action of said receivers to cover predetermined angular positions of reception, means for producing a signal characteristic of the angular positions of said receivers, a transmitter, and means for transmitting from said transmitter signals of a characteristic corresponding to the characteristc of said received signals, and said signals characteristic of the angular positions of said directive receivers.

2. A position indicating transmission system for transmitting a plurality of position indicating signals in response to received different characteristic signals from a plurality of sources, comprising first and second spaced directional receivers for receiving said signals, means for continuously angularly varying the directive action of said receivers to cover a predetermined angular range of reception, means for producing signals characteristic of the angular positions of said receivers, a transmitter, and means for transmitting from said transmitter signals of different characteristics corresponding to the characteristics of said received signals, and said signals characteristic of the angular positions of said directive receivers.

3. A position indicating transmission system for transmitting a plurality of position indicating signals in response to received different characteristic signals from a plurality of sources, comprising first and second spaced directional receivers for receiving said signals, means for continuously rotating the directive action of said receivers, means for producing a signal characteristic of the directive action positions of said receivers, a transmitter, and means for transmitting from said transmitter signals of different characteristics corresponding to the characteristics of said received signals, and signals characteristic of said rotary action positions.

4. A position indicating transmission system for transmitting a plurality of position indicating signals in response to received different characteristic signals from a plurality of sources, comprising first and second spaced directional receivers for receiving said signals, means for continuously angularly varying the directive action of said receivers to cover a predetermined angular range of reception, a transmitter, and means for transmitting from said transmitter signals of different characteristics corresponding to the characteristics of said received signals, signals characteristic of the directive action of said directive receivers, and signals identifying said transmission system.

5. A position indicating system comprising a first transmitter, means for transmitting a characteristic signal from said first transmitter, a directional receiver spaced from said first transmitter for receiving energy therefrom, means for adjusting said receiver to direction indicating position, a second transmitter, means for transmitting from said second transmitter a signal corresponding to the characteristic signal from said first transmitter and a signal characteristic of the direction indicating position of said directional receiver, and means adjacent said first transmitter responsive to said signals from said second transmitter for indicating the direction position of said directional receiver with respect to said first transmitter.

6. A position indicating system for indicating the position of a mobile unit as determined at a position determining location comprising a first transmitter at said unit, means for transmitting a characteristic signal from said first transmitter, a directional receiver at said position determining location for receiving energy therefrom, means for adjusting said receiver to direction indicating position, a second transmitter at said location, means for transmitting from said second transmitter a signal corresponding to the characteristic signal from said first transmitter and a signal characteristic of the direction indicating position of said directional receiver, and means at said unit responsive to said signals from said second transmitter for indicating the direction position of said directional receiver with respect to said unit.

7. A position indicating system for providing at each of a plurality of mobile units an indication of their location as determined at a location finding position comprising transmitter means at each unit, means for transmtting a signal characteristic of each unit from said respective transmitter means, a directional receiver at said location for receiving energy therefrom, means for continuously rotating said receiver to direction aligned positions with respect to said units, a transmitter at said location, means for transmitting from said transmitter signals corresponding to the characteristic signals from said transmitter means and a signal characteristic of the rotary position of said directional receiver, and means at each of said units responsive to said rotary characteristic and the respective unit characteristic signals from said transmitter for indicating their direction position with respect to said location finding position.

8. A system according to claim 7, further comprising means at said location for transmitting a location identifying signal, and means at each unit for selecting said identifying signal.

9. A position indicating system for providing at each of a plurality of mobile units indications of their location as determined at a location finding position, comprising means at each unit for transmitting a signal characteristic of said unit, means at said position for selectively and adjustably directionally receiving, and retransmitting said unit characteristic signals, means at said position for transmitting a signal characteristic of the directional adjustment of said directional receiving means, means at each of said units for receiving said retransmitted signals and the directional characteristic signal, and means for providing a directional indication at each unit in response to said received signals.

10. A position indicating method for providing at each of a plurality of mobile units indications of their location as determined at a location finding position, comprising transmitting from each unit a signal characteristic of said unit, selectively and adjustably directionally receiving and retransmitting said unit characteristic signal at said position, transmitting from said position a signal characteristic of the directional adjustment of the directional reception, receiving at each of said units said retransmitted signals and the directional characteristic signal, and producing directional indication at each unit in response to said received signals.

11. A position indicating system for providing at each of a plurality of mobile units indications of their location as determined at a location finding position, comprising means at each unit for transmitting a signal characteristic of said unit, spaced directional receiver means at said position for selectively and adjustably directionally receiving unit characteristic signals, means at said position for transmitting said unit characteristic signals received at both directional receivers and a signal characteristic of the directional adjustment of said directional receiver means, means at each of said units for receiving said retransmitted unit characteristic signals and the directional characteristic signal, and means for providing directional indications at each unit in response to said received signals.

12. A position indicating system for providing at each of a plurality of mobile units indications of their location as determined at a location finding position, comprising means at each unit for transmitting a signal characteristic of said unit, spaced directional receiver means at said position for receiving said unit characteristic signals, means for rotating the directivity of said receiver means to selectively successively align them with each of said units, means at said position for transmitting repeated signals corresponding to said received unit characteristic signals, and signals characteristic of the rotary adjustments of said directional receiver means, means at each of said units for receiving said retransmitted signals and the directional characteristic signal, and means for providing a directional indication at each unit in response to said received signals.

13. A system according to claim 12, further comprising means at said location for transmitting signals indicative of the identity of said positions, and means at each said unit for producing an indication of said identity.

14. In a position indicating system wherein is provided at a given position means for receiving and determining the direction of a source of signals, means for repeating a predetermined component of the signal energy together with a signal indicative of the determined direction of the source of said signal energy; a unit for use at the source of signal energy comprising a transmitter for transmitting a signal characterized by said predetermined component, receiver means for receiving the repeated component together with the signal indicative of the determined direction, means in the output of said receiver for separating said received signals, an indicator circuit, means for applying the signal indicative of the determined direction to said signal indicator to control one parameter of movement thereof, and means for applying the separated repeated components to said indicator to produce an indication of position along said parameter correspnding to the determined direction of said source of signals.

15. In a position indicating system wherein is provided at a given position means for separately receiving and determining the directions of a source of signals transmitted at different frequencies, means for repeating a common component of the signals together with a synchronizing signal indicative of the determined direction of the source of said signal energy; a unit for use at the source of signal energy comprising a transmitter for alternately transmitting different carrier frequencies, a signal characterized by said common component, receiver means for receiving the repeated components together with the signal indicative of the determined direction, means in the output of said receiver for separating said common component and said synchronizing signals from said received signals, an indicator circuit, means for applying said separated synchronizing signals to control one coordinate of movement of said indicator circuit, means for varying the position of said one coordinate in timed relation with alternation of said transmitter and means for applying the separated repeated components to said indicator to produce an indication of direction along said one coordinate in each of said alternate positions to provide direction indications corresponding to said separately determined directions.

16. A position indicating transmission system for transmitting to a mobile unit, having means for transmitting a signal characteristic of the unit, an indication of its location as determined at a location finding position comprising spaced means for separately receiving the signal from said unit, means for determining the directions of said unit from each of said spaced means, and means to retransmit said signal characteristic of the unit and a signal indicative of the determined directions of the source of said signal energy.

17. A position indicating transmission system for transmitting to each of a plurality of mobile units, each having means for transmitting a signal characteristic of the unit, indications of their location as determined at a location finding position, comprising means at said location finding position for receiving the signal energy from and determining the direction of each of said units comprising a pair of spaced apart antennas and means for comparing the timing of the signals received by said antennas, means to retransmit the signal characteristic of each unit and a signal indicative of the determined directions of the source of said signal energy.

18. A position indicating transmission system for transmitting to each of a plurality of mobile units, each having means for transmitting a signal of a frequency characteristic of the unit, indications of their location as determined at a location finding position, the means for determining their location comprising a pair of spaced apart antennas and apparatus for comparing the timing of the signals received by said antennas, means at said position for selectively directionally receiving and omni-directionally retransmitting said unit characteristic signals, and means at said position for transmitting a signal characteristic of the directional adjustment of said directionally receiving means.

FRANK J. LUNDBURG.

REFERENCES CITED

The following references are of record in the file of this patent:

UNITED STATES PATENTS

| Number | Name | Date |
|---|---|---|
| 2,027,528 | Hammond | Jan. 14, 1936 |
| 2,132,599 | Baumann et al. | Oct. 11, 1938 |
| 2,252,083 | Luck | Aug. 12, 1941 |
| 2,267,715 | Bowen | Dec. 30, 1941 |
| 2,307,029 | Elm | Jan. 5, 1943 |
| 2,321,698 | Nolde | June 15, 1943 |